United States Patent [19]
Yoshida et al.

[11] Patent Number: 5,677,813
[45] Date of Patent: Oct. 14, 1997

[54] ROTARY INFORMATION RECORDING AND REPRODUCTION APPARATUS

[75] Inventors: Takeshi Yoshida, Odawara; Kenji Mori, Tsuchiura; Toshihisa Okazaki, Odawara, all of Japan

[73] Assignee: Hitachi, Ltd., Tokyo, Japan

[21] Appl. No.: 764,190

[22] Filed: Dec. 13, 1996

[30] Foreign Application Priority Data

Dec. 18, 1995 [JP] Japan .................. 7-329104

[51] Int. Cl.⁶ .................. G11B 33/14; G11B 5/55
[52] U.S. Cl. .................. 360/97.02; 360/106
[58] Field of Search .................. 360/97.02, 106

[56] References Cited

U.S. PATENT DOCUMENTS

| | | | |
|---|---|---|---|
| 4,812,932 | 3/1989 | Hishinuma et al. | 360/97.01 |
| 5,027,242 | 6/1991 | Nishida et al. | 360/106 |

FOREIGN PATENT DOCUMENTS

| | | |
|---|---|---|
| 0 419 345 | 3/1991 | European Pat. Off. . |
| 0 567 833 | 11/1993 | European Pat. Off. . |
| 0 715 308 | 6/1996 | European Pat. Off. . |
| 581842A | 4/1993 | Japan . |

Primary Examiner—John H. Wolff
Attorney, Agent, or Firm—Kenyon & Kenyon

[57] ABSTRACT

An object of the present invention is to restrain the rigid body rotational vibration of a magnetic disc apparatus caused by the driving reaction force of a head in order to position the head quickly and precisely and to reduce the sizes of the magnetic disc apparatus. According to this invention, a dynamic damper having a natural frequency equal to the rigid body rotational frequency of the magnetic disc apparatus is provided in at least one of the four corners inside or outside a housing of the magnetic disc apparatus. The dynamic damper comprises a weight member and bar-like members acting like springs, and has an angled shape so as to meet the form factor standard sizes for magnetic disc apparatuses.

18 Claims, 10 Drawing Sheets

ROTARY INFORMATION RECORDING AND REPRODUCTION APPARATUS

BACKGROUND OF THE INVENTION

The present invention relates to a rotary information recording and reproduction apparatus that positions a head by rotationally moving it to a specified location in an information recording disc, and in particular, to a rotary information recording and reproduction apparatus that meets the standardized form factor standard sizes for the apparatus and which can reduce the structural vibration of a housing to position the head quickly and precisely.

Referencing U.S. Pat. No. 5,027,242, conventional magnetic disc apparatuses are described. A laminated information recording disc is rotationally driven at a constant rotational speed by a disc rotating motor fixed to a base. A head is supported to a carriage via a head supporting spring and suspended over the disc with a very small gap therebetween to record and reproduce information. The head can be positioned quickly and precisely by using a voice coil motor to rotationally drive the carriage.

The carriage is supported to a ball bearing disposed between the carriage and a rotating shaft fixed to the base in such a way that the carriage can rotate around the rotating shaft. The voice coil motor which drives the carriage comprises a voice coil, a permanent magnet and a yoke. The voice coil is attached to the carriage, and the permanent magnet and the yoke (which are collectively referred to as a "magnet and yoke assembly") are fixed on the base. Since the voice coil sandwiched between the magnet and yoke assembly is subjected to magnetic fields, electricity can be applied to the voice coil to drive it so as to position the head on a target track.

When, however, electricity is applied to the voice coil to generate drive force, the magnet and yoke assembly, subjected to the resulting reaction force, excites the base. That is, the base is vibrated when the carriage performs a seek operation. This exciting force causes the disc rotating motor to be excited to vibrate the disc. As a result, during positioning, there occurs a relative displacement between the head supported by the carriage and the disc. This causes off-track and increases the time required for positioning, thereby affecting positioning performance.

The magnetic disc apparatus is often attached to an external enclosure using screws, and the external enclosure generally comprises sheet metal. Thus, the exciting force described above causes the overall apparatus including the external enclosure to vibrate, thereby preventing accurate positioning. Quick and precise positioning requires the reduction of the vibration of the magnetic disc apparatus caused by the driving reaction force.

One of the means for solving the above problems is described in, for example, Japanese Patent Unexamined Publication No. 5-81842. In this example, an inertia load oil damper or a viscous load mass damper is installed on the external surface of the rear end of the base. By installing such a damper on the base, it is possible to convert vibration remaining in the magnetic disc apparatus after a seek operation or external vibration energy, into heat energy inside oil or a viscous body and to consume this heat energy therein, so that the remaining or external vibration energy can be reduced.

SUMMARY OF THE INVENTION

The conventional technique disclosed in the Japanese Patent Unexamined Publication No. 5-81842 been converted, inside the damper in order to absorb the vibration energy. The efficiency in using the vibration energy to move the oil or viscous body to convert it into heat energy is not so high, so this technique has not allowed the vibration of the magnetic disc apparatus to be sufficiently absorbed.

In addition, apparatus standard sizes (length, width, and height) referred to as the standardized form factors are specified for magnetic disc apparatuses, and must be met by these apparatuses. According to the above conventional technique, such a damper is installed on the outer surface of the rear end of the base, so the sizes of the overall magnetic disc apparatus including the damper increase and thus deviate from the form factor apparatus standard sizes.

It is an object of this invention to provide a mechanism that prevents the vibration of the housing caused by the carriage driving reaction force during the positioning of the head and which meets the form factor standard sizes for magnetic disc apparatuses. This enables the head to be positioned quickly and precisely and reduces the sizes and thickness of the magnetic disc apparatus.

It is another object of this invention to provide a positioning mechanism that allows the apparatus to meet the form factor standard sizes for small magnetic disc apparatuses such as 1.3, 1.8, 2.5, 3.5, and 5.25 inches and which is not significantly subjected to vibration.

To achieve the above objects, this invention includes dynamic dampers on the inner or outer surface of the housing so as not to deviate from the form factor standard sizes for magnetic disc apparatuses.

The dynamic damper is disposed in one of the four corners of the housing, two diagonal corners thereof, or all the four corners thereof.

The dynamic damper comprises a weight and bar-like members acting like springs. The weight has an angled shape and is integrated with the bar-like members of the dynamic damper. The other end of the bar-like member is coupled to the housing.

Furthermore, the dynamic damper comprises a single weight body and a plurality of bar-like members acting like springs, and some of the plurality of bar-like members are secured to the weight and the housing while the rest of the members can be moved in the axial direction of the bar relative to the weight and the housing. By pressing the bar-like members into holes drilled in the housing, the weight and the housing are coupled together to increase the supporting rigidity of the weight, and de-coupling them enables the supporting rigidity of the weight to be reduced. In addition, moving the bar-like members enables the natural frequency of the dynamic damper to be varied.

In addition, the bar-like member of the dynamic damper has a structure composed of the same material, a structure composed of the same material with a viscoelastic member adhering to its surface, or a structure composed of a pencil of lines or stranded wires combined together using a viscoelastic resin.

In addition, the weight comprises two or more weight members and a viscoelastic sheet that couples the weight members together.

Alternatively, a plurality of dynamic dampers are provided in the housing and the mass of the weight and the spring rigidity of the bar-like member are set so that each dynamic damper has a different natural frequency.

Alternatively, a viscoelastic material is filled between the dynamic damper and the housing.

If the natural frequency of the in-plane rigid body rotational vibration of the apparatus in the case in which the apparatus is fixed and supported to the external enclosure is referred to as ($f_1$) and the natural frequency of the dynamic damper is referred to as ($f_2$), the mass of the weight constituting the dynamic damper and the spring rigidity of the bar-like member also constituting the dynamic damper are set so that ($f_2$) is almost the same as ($f_1$).

In addition, the dynamic damper has a vertically symmetric rigidity.

When the fixing point between the bar-like member and the housing is referred to as P and the location of the center of gravity of the apparatus is referred to as G, the dynamic damper is configured so that the axis of the bar-like member generally overlaps the straight line passing through the points P and G.

DETAILED DESCRIPTION

Embodiments of this invention are described below with reference to the drawings.

Figure 1:
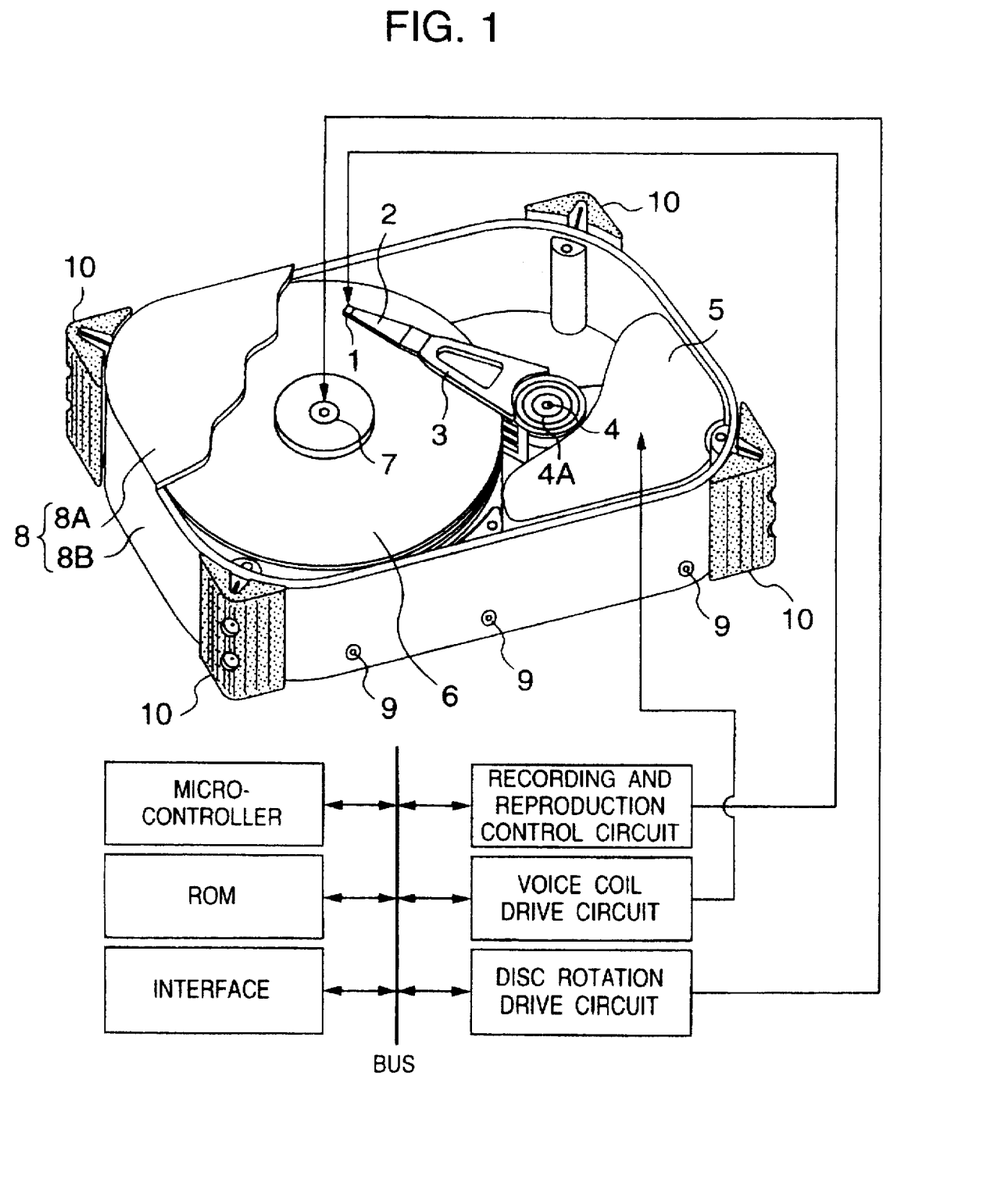
FIG. 1 shows the overall configuration of one embodiment of a rotary information recording and reproduction apparatus according to this invention.

FIG. 1 shows the overall configuration of a rotary information recording and reproduction apparatus according to this invention. A laminated magnetic disc 6 is rotationally driven by a magnetic disc rotationally driving motor 7 fixed to a base 8A. A head 1 for recording and reproducing information is attached to a carriage 3 via a head supporting spring 2. Two rolling bearings 4A are engaged with a carriage rotating shaft 4 fixed to the base 8A, and the carriage 3 is engaged with the outer ring of the rolling bearing so as to be rotationally supported around the carriage rotating shaft. The carriage 3 is rotationally driven by a voice coil motor comprising a magnet and yoke assembly 5 consisting of a yoke and a permanent magnet; and a drive coil (not shown) provided in the carriage 3, in order to position the head 1 on a specified track of a disc 6 for the recording or reproduction of information. The apparatus is housed in a housing 8 (in this figure, the housing is shown to be partially broken) comprising the base 8A and a cover 8B.

Electricity is applied to the drive coil to generate a thrust, which is then used to position the head 1 on a specified track. When the thrust is generated, reaction force is generated in the magnet and yoke assembly 5 in the opposite direction to the thrust. Since the magnet and yoke assembly 5 is fixed to the base 8A using screws, the reaction force excites the base 8A. That is, the base is vibrated when the carriage performs a seek operation. The magnetic disc apparatus is fixed and supported to an external enclosure generally made of sheet metal using threads 9 provided in the base 8A. Thus, when vibrating, the base 8A has a natural frequency determined by the mass of the magnetic disc apparatus and the rigidity of the external enclosure.

When the head is positioned to cause the base 8A to be excited, the magnetic disc apparatus and the external enclosure are excited and the apparatus undergoes a rigid body rotational vibration, depending on the contents of the positioning operation, that is, the magnitude of the positioning driving force and the length of acceleration and deceleration time. Thus, this embodiment includes dynamic dampers 10 on the outer surface of the housing 8 to restrain the rigid body rotational vibration of the magnetic disc apparatus caused by the positioning operation. The dynamic damper 10 is a small vibration system consisting of a "mass" and a "spring", and the magnitude of the mass and spring of the dynamic damper is selected so that the speed of the natural frequency of the dynamic damper is equal to the speed of the vibration of the magnetic disc apparatus caused by exciting force. When the exciting force acts on the apparatus, only the dynamic dampers vibrate whereas the vibration of the apparatus is restrained. This is publicly known as described in "Elementary Dynamics", Shigekazu Moriguchi, Baifukan, Sep. 20, 1959 (first edition), pp. 268 to 269.

Figure 2A:
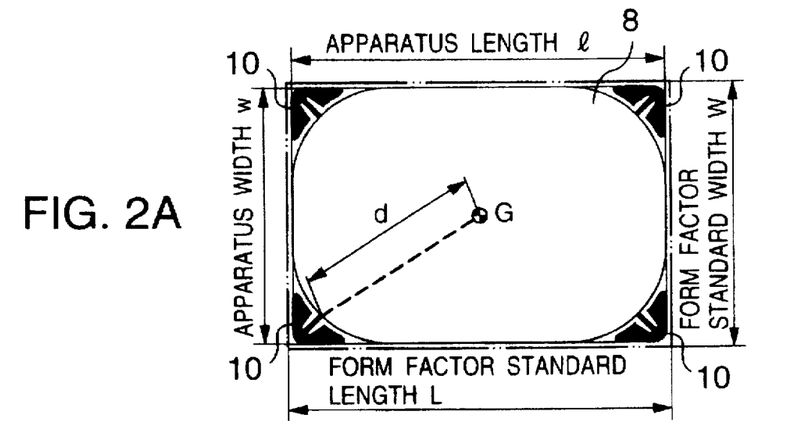
FIGS. 2A, 2B and 2C show the position of dynamic dampers according to one embodiment of this invention.
Figure 2B:
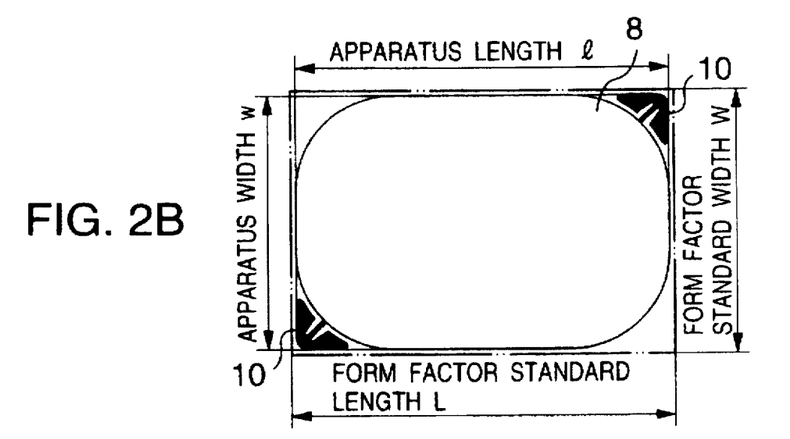
Figure 2C:
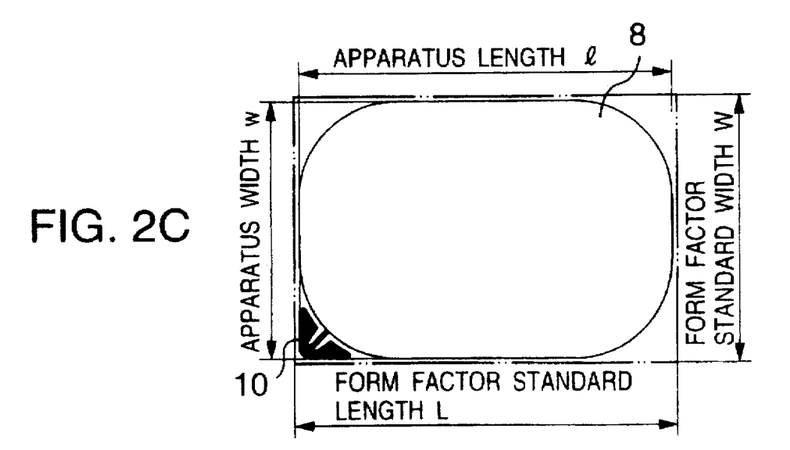

The position of the dynamic dampers is described with reference to FIGS. 2A–2C and 3A–3C. FIGS. 2A–2C are plan views of the magnetic disc apparatus. The dynamic damper 10 is provided on the outer surface of the four corners of the housing 8, as shown in FIG. 2A. The dynamic dampers must be provided in such a way that the overall magnetic disc apparatus including the dynamic dampers meets the standardized form factor standard sizes (length L, width W, and height H). That is, the length (l) of the magnetic disc apparatus shall be smaller than or equal to the form factor standard length L, the width (w) shall be smaller than or equal to the form factor standard width W, and the height (h) (not shown) shall be smaller than or equal to the form factor standard height H (not shown). FIG. 2B shows the case in which the dynamic damper is provided in two diagonal locations of the housing 8. FIG. 2C shows the case in which the dynamic damper is provided in one of the four corners of the housing 8. The four corners of the rectangular housing 8 are chamfered. The dynamic damper is housed in a space formed by the outer surface of a corner of the rectangular housing 8 and planes formed by extending two sides adjacent to each other in the corner, and constitutes a weight structure with an angled cross section.

Figure 3A:
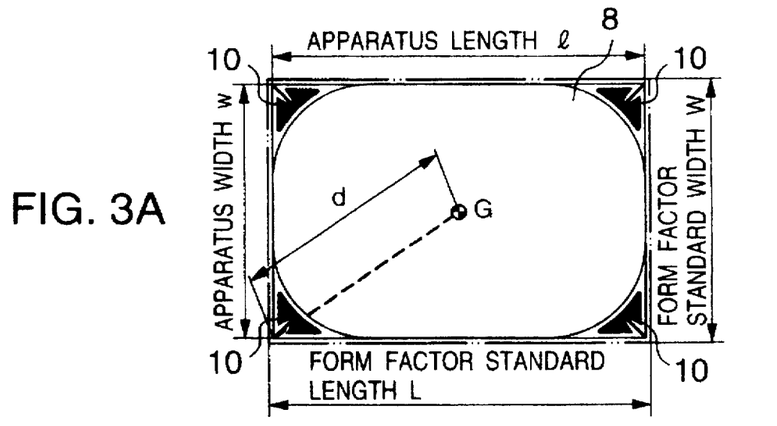
FIGS. 3A, 3B and 3C show the position of the dynamic dampers according to another embodiment of this invention.
Figure 3B:
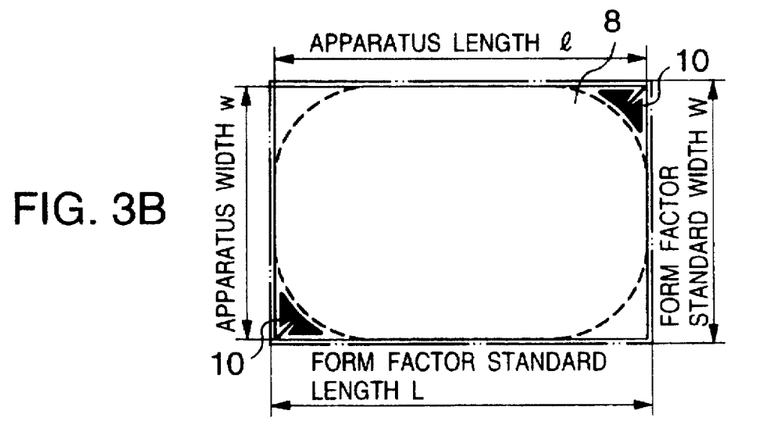
Figure 3C:
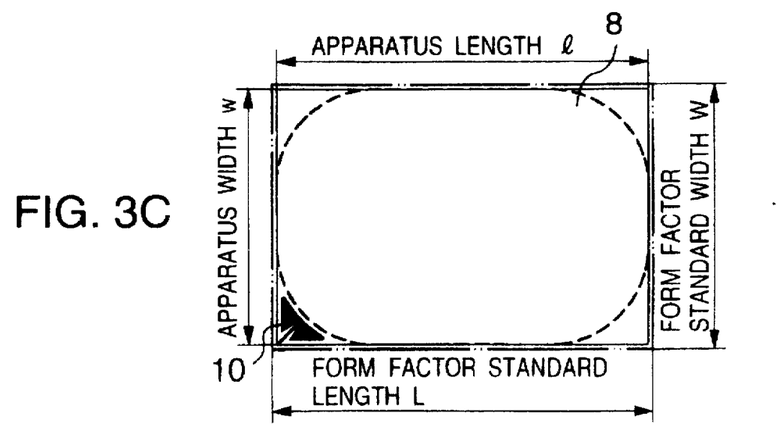

FIG. 3A shows the case in which the dynamic damper 10 is provided on the inner surface of the four corners of the housing 8. FIG. 3B shows the case in which the dynamic damper 10 is provided in two diagonal locations of the housing 8. FIG. 3C shows the case in which the dynamic damper is provided in one of the four corners of the housing 8. In any case, the dynamic damper must be of such a size as to enable the apparatus to meet the form factor standard sizes. These dynamic dampers each constitute a weight structure that fits the shape of the inner surface of the four corners of the rectangular housing 8.

As described above, when the dynamic damper 10 is provided in any of the four corners of the housing 8, distance (d) from the location of the center of gravity G of the magnetic disc apparatus to the dynamic damper fixing location increases compared to the case in which the dynamic damper is provided on vertical or horizontal sides of the magnetic disc apparatus. Thus, when the head is positioned to cause the rigid body rotational vibration of the apparatus around the center of gravity, the dynamic dampers can be effectively excited to sufficiently restrain the vibration of the magnetic disc apparatus body.

Figure 4A:
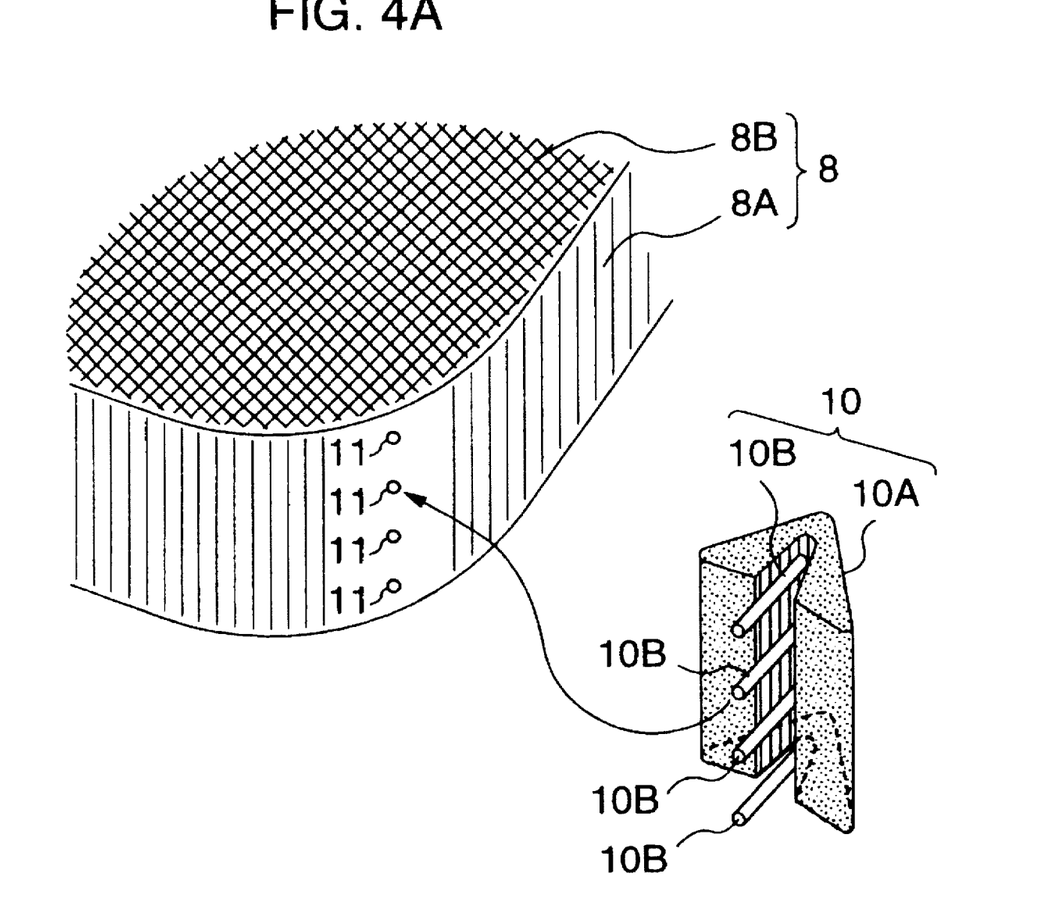
FIGS. 4A and 4B show the structure of a dynamic damper according to one embodiment of this invention.
Figure 4B:
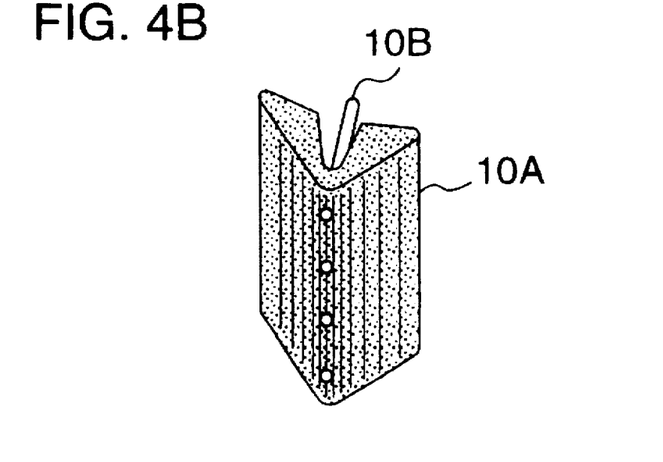

Next, the structure of the dynamic damper is explained with reference to FIGS. 4A and 4B. These figures show one embodiment of the case in which the dynamic damper is provided on the outer surface of the housing. FIG. 4A shows the structure of the dynamic damper 10 and the coupling of the dynamic damper 10 to the housing 8. FIG. 4B is a rear view of the dynamic damper 10. The dynamic damper 10 comprises a weight 10A and a plurality of bar-like members 10B acting like springs. The dynamic damper 10 is prepared as an assembly integrated by securing the bar-like members 10B to the weight 10A using a press-in or an adhesion process.

The tips of the bar-like members 10B of the dynamic damper 10 are secured into holes 11 provided in the base 8A that is a part of the housing 8, using a press-in or an adhesion process. If the dynamic damper is provided in the four corners of the magnetic disc apparatus, a relatively large space is available in which these dynamic dampers can be housed. Thus, according to this invention, the weight 10A has an angled shape, extends as far as possible within the space, and has a sufficiently large volume and an increased mass. As a result, when the dynamic dampers are excited, sufficiently large kinetic energy can be generated to restrain the vibration of the magnetic disc apparatus. Although this embodiment has been described in conjunction with the four bar-like members 10B, this invention is not limited to this number.

Figure 5:
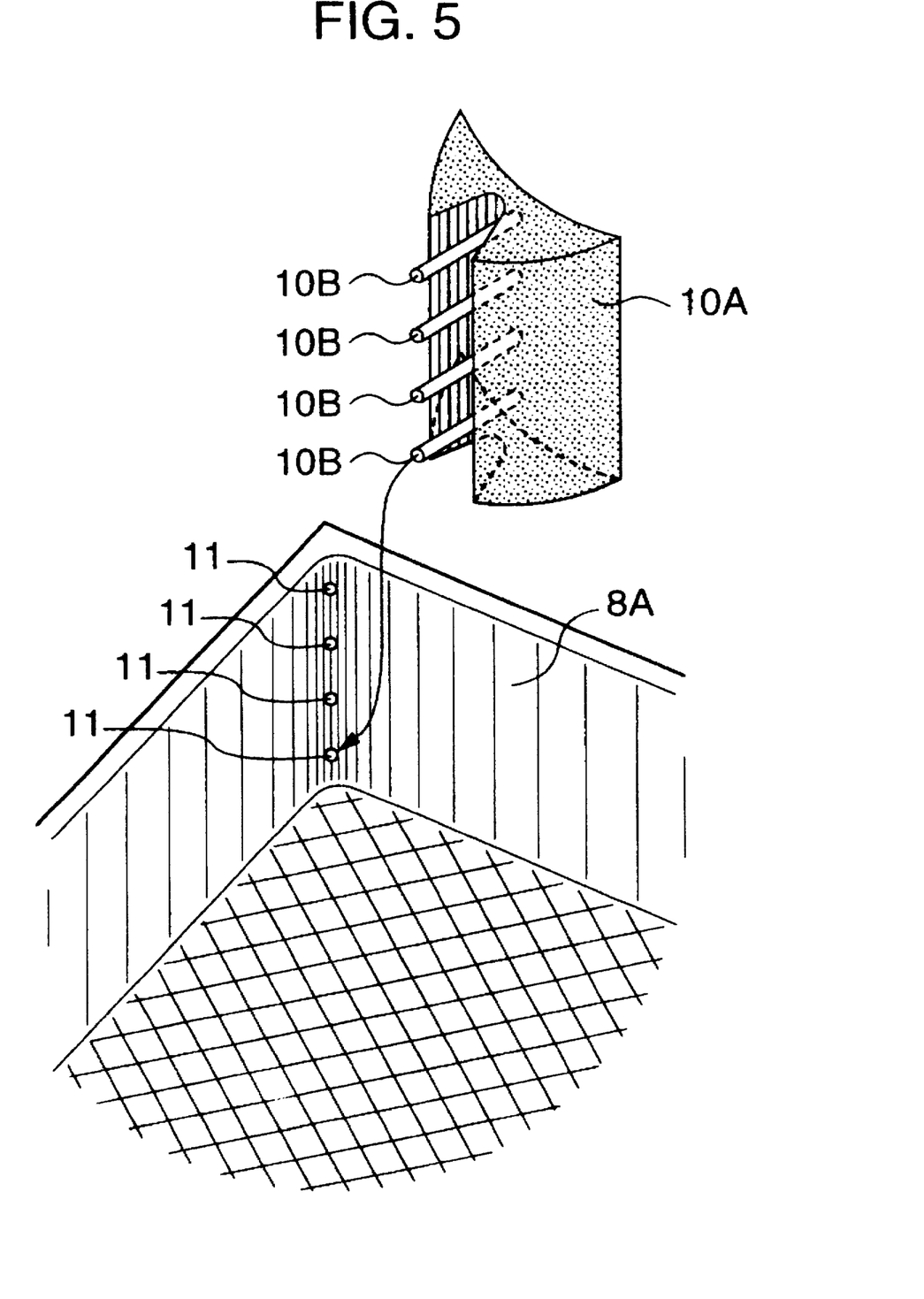
FIG. 5 shows the structure of a dynamic damper according to another embodiment of this invention.

FIG. 5 shows one embodiment in which the dynamic damper is provided on the inner surface of the housing. Fundamentally, this embodiment has the same structure as in FIG. 4A except for the weight shape and the mounting location of the bar-like members. As in the embodiment in FIG. 4A, the weight extends as far as possible within the space, and has a sufficiently large volume and an increased mass. The tips of the bar-like members 10B of the dynamic damper 10 are secured into the holes 11 provided in the base 8A that is a part of the housing 8, using a press-in or an adhesion process. Although this embodiment has also been described in conjunction with the four bar-like members 10B, this invention is not limited to this number.

Since the magnetic disc apparatus is fixed and supported to the external enclosure, the natural frequency of the rigid body rotational vibration during positioning varies depending on the magnitude of the rigidity of the external enclosure. This invention thus has a structure for varying the natural frequency of the dynamic damper. Even if the magnetic disc apparatus is fixed and supported to a different external enclosure, the natural frequency of the dynamic damper can be optimized by tuning it to the system, thereby restraining the structural vibration of the magnetic disc apparatus.

Figure 6A:
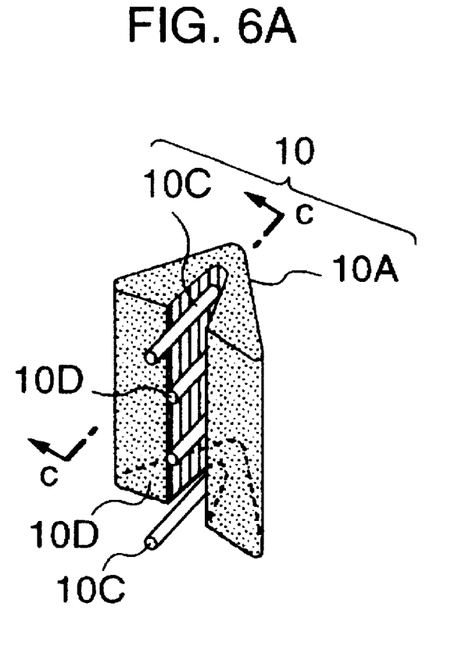
FIGS. 6A, 6B and 6C show the structure of a supporting-rigidity-variable dynamic damper according to another embodiment of this invention.
Figure 6B:
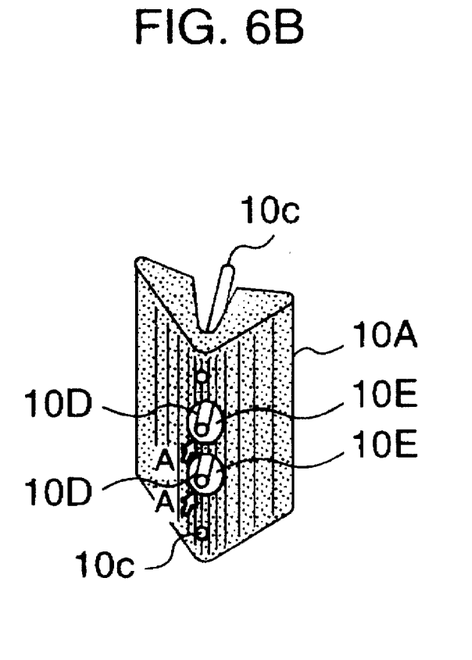
Figure 6C:
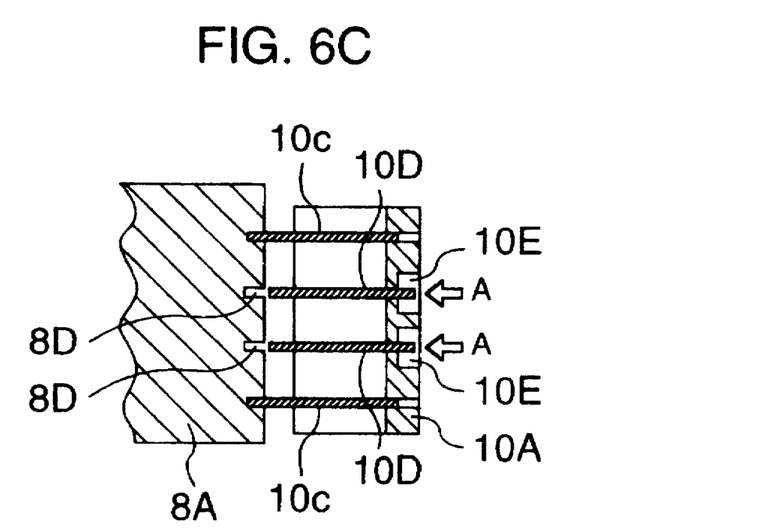

FIG. 6A is a perspective view showing the structure of a natural-frequency-variable dynamic damper, FIG. 6B is a rear perspective view of this dynamic damper, and FIG. 6C is a cross-sectional view in which the dynamic damper is shown to be cut along line C—C shown in FIG. 6A. A top and a bottom bar-like members 10C of the dynamic damper 10 are secured to the weight 10A and the base 8A. Two remaining bar-like members 10D can be moved in the axial direction of the bar relative to the weight and the base 8A.

By pressing the movable bar-like members 10D in the direction A shown in the figure toward holes 8D drilled in the base 8A, the weight 10A and the base 8A are coupled together to increase the supporting rigidity of the weight, that is, the spring constant of the dynamic damper. In addition, by using an appropriate tool to pull back the tips of the movable bar-like members 10D in order to de-couple them, the supporting rigidity of the weight can be reduced. Thus, the movable bar-like members 10D can be moved so as to vary the natural frequency of the dynamic damper according to the system. Although this embodiment has been described in conjunction with the two fixed bar-like members and the two movable bar-like members, this invention is not limited to these numbers.

Figure 7A:
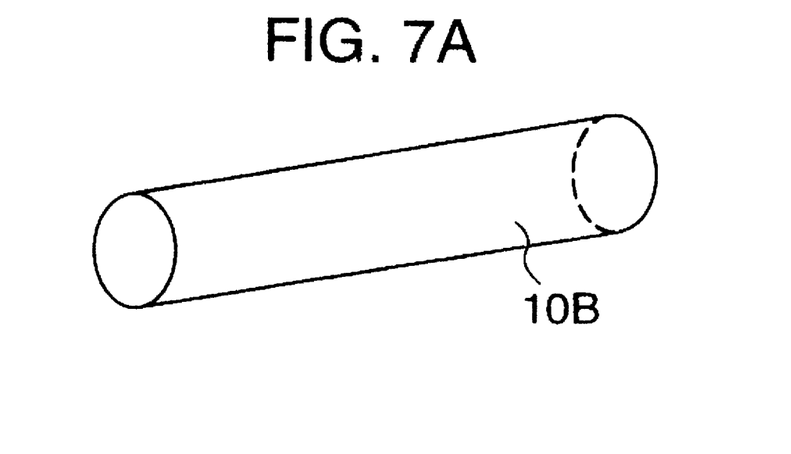
FIGS. 7A, 7B and 7C show the structure of a bar-like member according to embodiments of this invention.
Figure 7B:
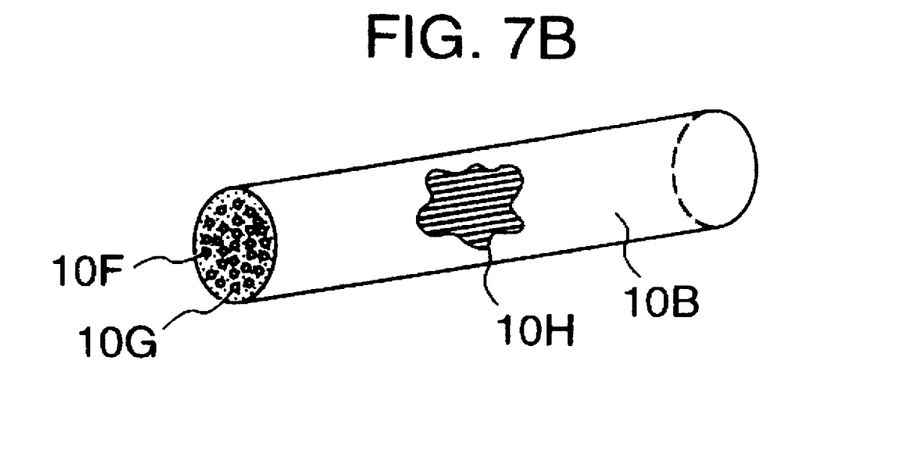
Figure 7C:
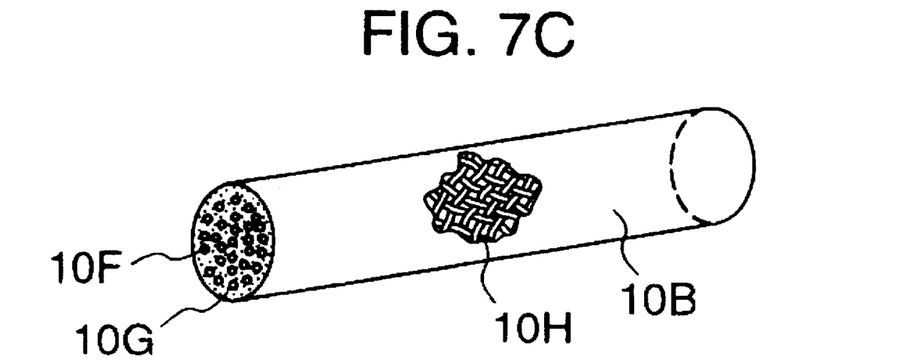

The structure of the bar-like members constituting the dynamic damper is explained with reference to FIGS. 7A-7C. The bar-like member 10B of the dynamic damper has a structure composed of a single material as shown in FIG. 7A, a structure composed of a pencil of straight lines 10F combined with a viscoelastic resin 10G as shown in FIG. 7B, or a structure composed of stranded wires 10F combined together with the viscoelastic resin 10G as shown in FIG. 7C. Reference numeral 10H in FIGS. 7B and 7C designates a broken-out section showing the internal structure of the bar-like member. The bar-like member 10B may also comprise a structure of the same material as shown in FIG. 7A with a viscoelastic member sticking to the surface thereof. The use of such a structure to allow the dynamic damper to produce a damping effect enables the vibration to be reduced even at exciting frequencies other than the natural frequency of the dynamic damper.

The dynamic damper described above desirably has a vertically symmetric rigidity. This makes it unlikely to excite vibration in directions other than the direction parallel to the bottom surface of the base of the magnetic disc apparatus, thereby preventing positioning from being adversely affected.

Figure 8A:
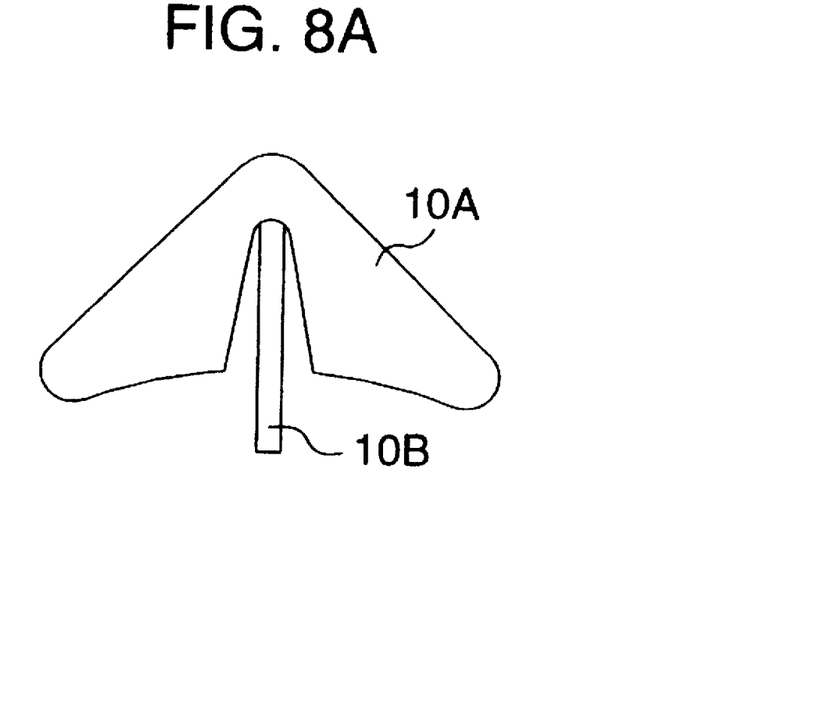
FIGS. 8A and 8B show the structure of a weight according to embodiments of this invention.
Figure 8B:
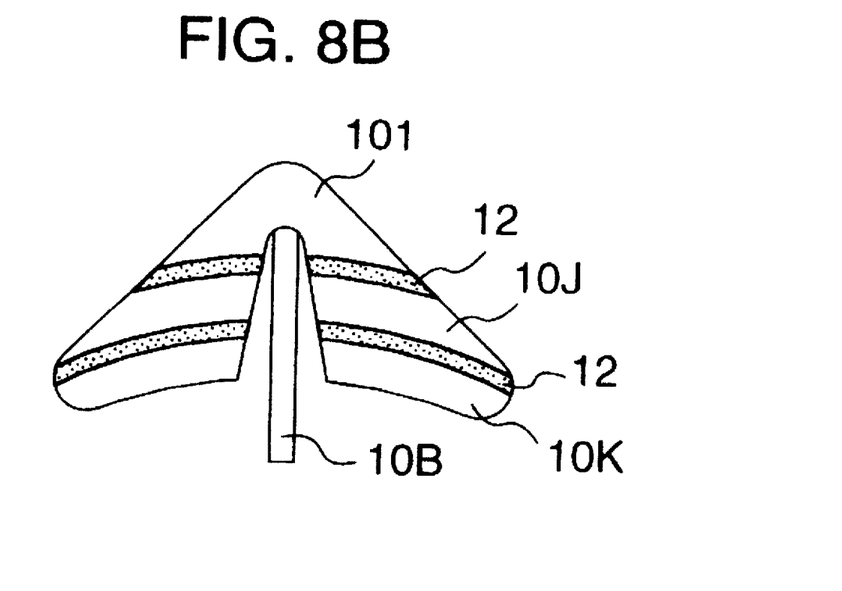

The structure of the weight is described with reference to FIGS. 8A and 8B. The weight 10A may have an integral structure of the same member as shown in FIG. 8A or a plurality of weight members 10I, 10J and 10K may be coupled together using a viscoelastic member 12 as shown in FIG. 8B. In addition, according to the embodiment shown in FIG. 8A, the weight may have an integral structure in which not only the weight but also the bar-like members are composed of the same material.

It is important to note that if the natural frequency of the in-plane rigid body rotational vibration of the apparatus in the case in which the apparatus is fixed and supported to the external enclosure is referred to as $(f_1)$ and the natural frequency of the dynamic damper is referred to as $(f_2)$, the mass of the weight constituting the dynamic damper and the spring rigidity (spring constant) of the bar-like member also constituting the dynamic damper are set so that $(f_2)$ is almost the same as $(f_1)$. When the head is positioned to cause the rigid body rotational vibration of the magnetic disc apparatus, the above constitution allows the dynamic damper to oscillate to restrain the vibration of the magnetic disc apparatus.

Figure 11:
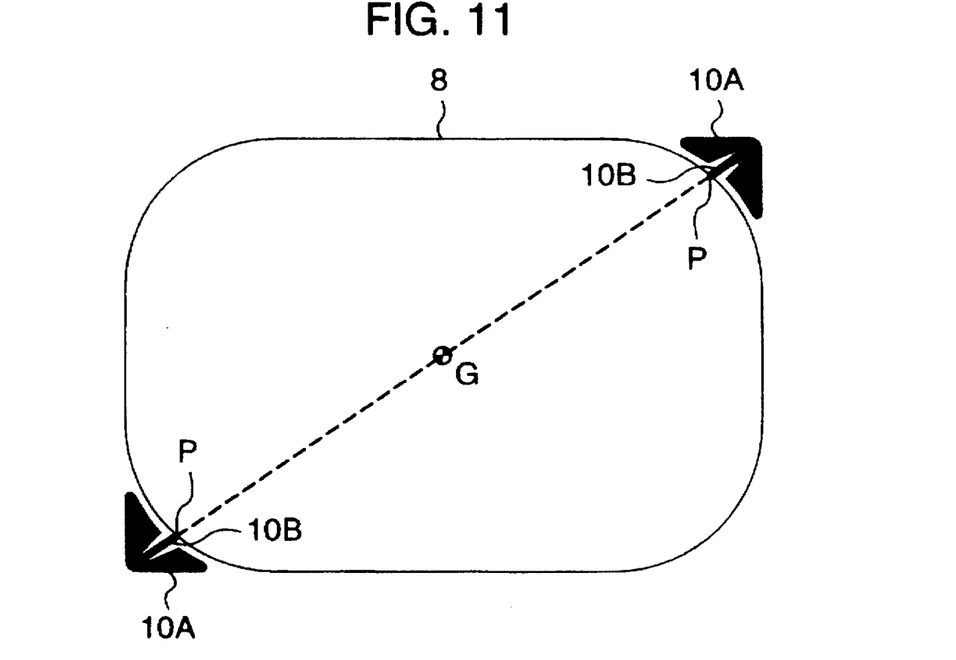
FIG. 11 shows the locational relationship for bar-like members according to one embodiment of this invention.

FIG. 11 shows another embodiment of the locational relationship between the fixing point between the bar-like member and the housing and the location of the center of gravity of the apparatus. When the fixing point between the bar-like member 10B and the housing 8 is referred to as P and the location of the center of gravity of the apparatus is referred to as G, the dynamic damper is configured so that the axis of the bar-like member 10B generally overlaps the straight line passing through the points P and G. Consequently, when the head is positioned, the apparatus is subjected to rigid body rotational vibration around the center of gravity, thereby enabling the dynamic dampers to be effectively excited to sufficiently restrain the vibration of the magnetic disc apparatus.

Figure 9:
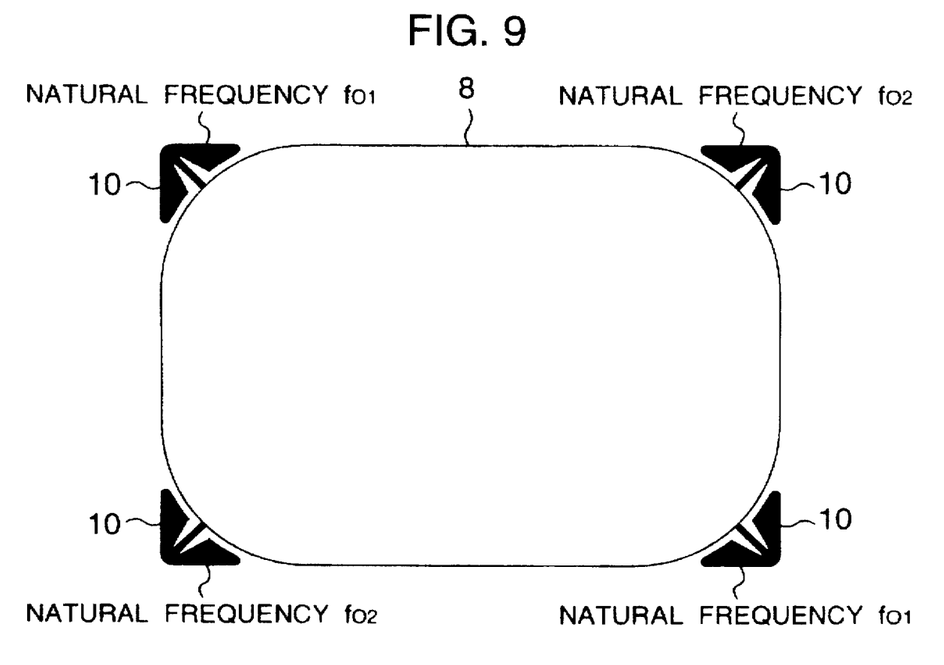
FIG. 9 shows the structure of a dynamic damper according to another embodiment of this invention.

FIG. 9 shows an embodiment in which the vibration of the magnetic disc apparatus can be reduced despite changes in the natural frequency of the in-plane rigid body rotational vibration of the magnetic disc apparatus. According to this embodiment, four dynamic dampers 10 are provided in the housing 8 and the mass of the weight and the spring rigidity of the bar-like member are set so that each dynamic damper has a some-what different natural frequency. As a result, despite changes in the exciting frequency for the magnetic disc apparatus, the dynamic dampers can be oscillated to restrain the vibration of the magnetic disc apparatus body.

Figure 10:
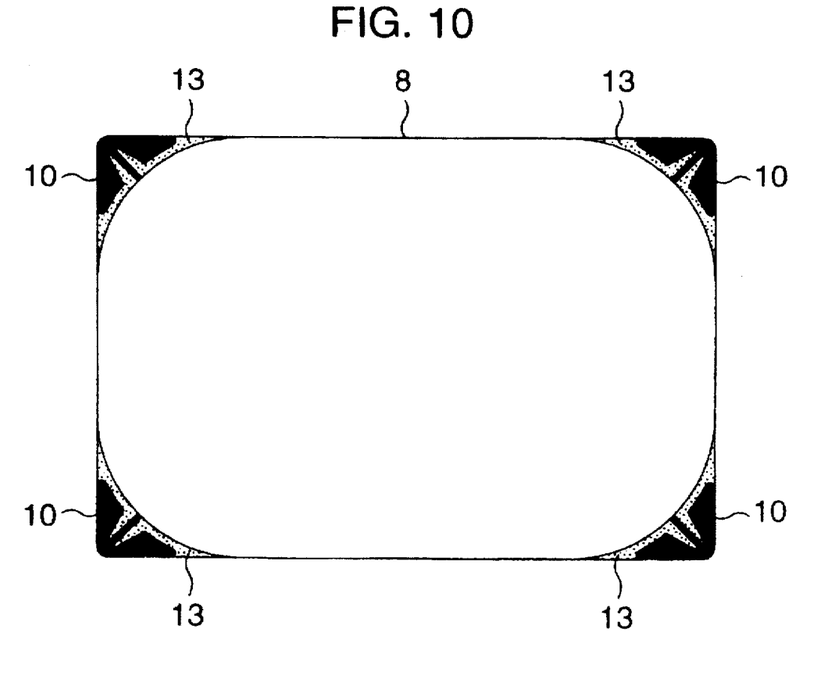
FIG. 10 shows the structure of a dynamic damper according to another embodiment of this invention.

FIG. 10 shows an embodiment of a structure in which a viscoelastic material 13 is filled between the dynamic damper 10 and the housing 8. The viscoelastic resin or member can be used in the bar-like members and weight of the above structure (see FIGS. 7B, 7C, and 8B). The use of such a structure to allow the dynamic damper to produce a damping effect enables the vibration of the magnetic disc apparatus to be reduced even at exciting frequencies other than the natural frequency of the dynamic damper.

This invention includes the dynamic dampers on the inner or outer surface of the housing so as not to deviate from the form factor standard sizes for magnetic disc apparatuses. If the natural frequency of the in-plane rigid body rotational vibration of the apparatus in the case in which the apparatus is fixed and supported to the external enclosure is referred to as ($f_1$) and the natural frequency of the dynamic damper is referred to as ($f_2$), the mass of the weight constituting the dynamic damper and the spring rigidity of the bar-like member also constituting the dynamic damper are set so that ($f_2$) is almost the same as ($f_1$). Thus, when the head is positioned to cause the rigid body rotational vibration of the magnetic disc apparatus, the above constitution allows the dynamic dampers to oscillate to restrain the vibration of the magnetic disc apparatus body.

The dynamic damper is disposed in one of the four corners of the housing, two diagonal corners thereof, or all the four corners thereof. Consequently, the distance from the location of the center of gravity of the magnetic disc apparatus to the dynamic damper fixing location increases compared to the case in which the dynamic damper is provided on vertical or horizontal sides of the magnetic disc apparatus. Thus, when the head is positioned to cause the rigid body rotational vibration of the apparatus around the center of gravity, the dynamic dampers can be effectively excited to sufficiently restrain the vibration of the magnetic disc apparatus body.

The dynamic damper comprises the weight and the bar-like members acting like springs with the weight and the bar-like members integrated together. The other end of the bar-like member is coupled to the housing. A relatively large space is available in the four corners of the magnetic disc apparatus in which the dynamic damper can be housed. Thus, according to this invention, the weight has an angled cross section, extends as far as possible within the space, and has a sufficiently large volume and an increased mass. As a result, when the dynamic dampers are excited, sufficiently large kinetic energy can be generated to restrain the vibration of the magnetic disc apparatus.

In addition, when the fixing point between the bar-like member and the housing is referred to as P and the location of the center of gravity of the apparatus is referred to as G, the dynamic damper is configured so that the axis of the bar-like member generally overlaps the straight line passing through the points P and G. Consequently, when the head is positioned to cause the rigid body rotational vibration of the magnetic disc apparatus around the center of gravity, the dynamic dampers can be effectively excited to sufficiently restrain the vibration of the magnetic disc apparatus body.

In addition, the dynamic damper has a vertically symmetric rigidity. This makes it unlikely to excite vibration in directions other than the direction of the surface of the magnetic disc apparatus, thereby preventing positioning from being adversely affected.

In addition, the dynamic damper comprises the single weight body and a plurality of bar-like members, and some of the plurality of bar-like members are secured to the weight and the housing while the rest of the members can be moved in the axial direction of the bar-like members relative to the weight and the housing. By pressing the bar-like members into holes drilled in the housing, the weight and the housing are coupled together to increase the supporting rigidity of the weight, and de-coupling them enables the supporting rigidity of the weight to be reduced. In addition, moving the bar-like members enables the natural frequency of the dynamic damper to be varied. Thus, even if the magnetic disc apparatus is fixed and supported to a different external enclosure, the natural frequency of the dynamic damper can be optimized by tuning it to the system, thereby restraining the structural vibration of the magnetic disc apparatus.

In addition, each bar-like member of the dynamic damper has a structure composed of a single material, a structure composed of the single material with a viscoelastic member adhering to its surface, or a structure composed of a pencil of lines or stranded wires combined together using a viscoelastic resin. The weight has a structure composed of a single material and comprises two or more weight members and a viscoelastic sheet that couples the weight members together. Alternatively, a viscoelastic material is filled between the dynamic damper and the housing. The use of such a structure to allow the dynamic damper to produce a damping effect enables the vibration to be reduced even at exciting frequencies other than the natural frequency of the dynamic damper.

Alternatively, a plurality of dynamic dampers are provided in the housing and the mass of the weight and the spring rigidity of the bar-like member are set so that each dynamic damper has a different natural frequency. As a result, despite changes in the exciting frequency for the magnetic disc apparatus, the dynamic dampers can be oscillated to restrain the vibration of the magnetic disc apparatus body.

Figure 12:
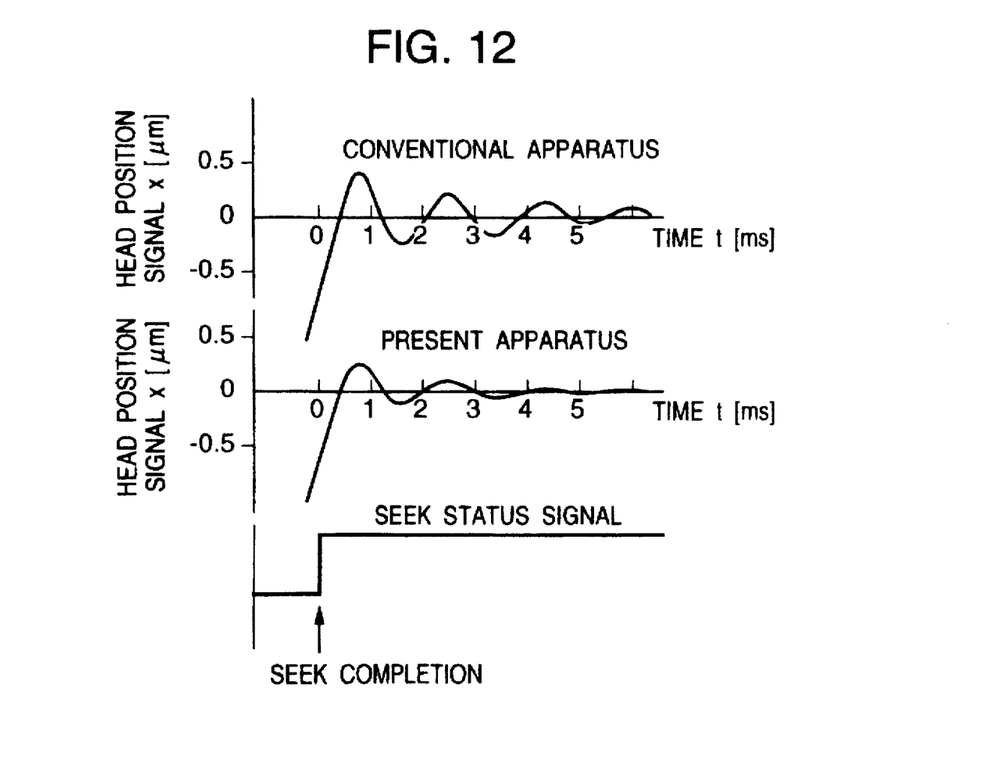
FIG. 12 shows the effects of this invention.

The effects of this invention described above are described with reference to FIG. 12. This figure shows head position signals obtained in the magnetic disc apparatus according to this invention after a seek operation has been completed. It also shows the low frequency vibration components of the rigid body rotational vibration of the magnetic disc apparatus. Compared to conventional methods, the method according to this invention reduces the residual vibration amplitude and damps the residual vibration quickly.

As described above, this invention can reduce the residual vibration after the positioning of the head and also reduce the residual vibration settling time, thereby enabling positioning to be achieved quickly and precisely. In addition, all the dynamic dampers described above are configured to meet the standardized form factor standard sizes for magnetic disc apparatuses, so this invention enables the sizes of the magnetic disc apparatus to be reduced.

We claimed:

1. A rotary information recording and reproduction apparatus comprising a magnetic disc on which information is recorded, a head for recording and reproducing information on and from the magnetic disc, a carriage that supports the head and which is rotated in the radial direction of said magnetic disc to position the head on the magnetic disc, a carriage drive section for applying a rotational torque to said carriage, and a rectangular housing having a base and a cover which supports and encloses said disc, said carriage and said carriage drive section, wherein:

a dynamic damper having a weight member and bar-like members acting like springs, which are all integrated together, is provided on the outer surface of at least one of four corners of said rectangular housing;

said weight member of said dynamic damper has an angled cross-section so as to be housed in a space formed by extending two planes of the rectangular housing which surround the location in which the dynamic damper is provided;

said dynamic damper is fixed to the base of said housing by means of said bar-like members; and a natural frequency of said dynamic damper is equal to a rigid body rotational frequency of said information recording and reproduction apparatus.

2. A rotary information recording and reproduction apparatus comprising a magnetic disc on which information is recorded, a head for recording and reproducing information on and from the magnetic disc, a carriage that supports the head and which is rotated in the radial direction of said magnetic disc to position the head on the magnetic disc, a carriage drive section for applying a rotational torque to said carriage, and a rectangular housing having a base and a cover which supports and encloses said disc, said carriage and said carriage drive section, wherein:

a dynamic damper having a weight member and a plurality of bar-like members acting like springs, which are all integrated together, is provided on the inner surface of at least one of four corners of said rectangular housing;

said weight member of said dynamic damper has an angled cross-section so as to conform to the shape of the inner surface of the rectangular housing on which the dynamic damper is provided;

said dynamic damper is fixed to the base of said housing by means of said bar-like members; and a natural frequency of said dynamic damper is equal to a rigid body rotational frequency of said information recording and reproduction apparatus.

3. A rotary information recording and reproduction apparatus according to claim 1 wherein some of said bar-like members of said dynamic damper are fixed to said weight member and said housing, whereas the rest of said bar-like members can be moved in the axial direction of the bar-like members relative to said weight member and said housing, by pressing said movable bar-like members into holes drilled in the housing, said weight member and said housing are coupled together to increase the supporting rigidity of said weight member, while decoupling said weight member and said housing enables the supporting rigidity of said weight member to be reduced, and moving said movable bar-like members enables the natural frequency of said dynamic damper to be varied.

4. A rotary information recording and reproduction apparatus according to claim 2 wherein some of said plurality of bar-like members of said dynamic damper are fixed to said weight member and said housing, whereas the rest of said bar-like members can be moved in the axial direction of the bar-like members relative to said weight member and said housing.

by pressing said movable bar-like members into holes drilled in the housing, said weight member and said housing are coupled together to increase the supporting rigidity of said weight member, while decoupling said weight member and said housing enables the supporting rigidity of said weight member to be reduced, and moving said movable bar-like members enables the natural frequency of said dynamic damper to be varied.

5. A rotary information recording and reproduction apparatus according to claim 1 wherein a plurality of dynamic dampers are provided and wherein the mass of said weight member and spring rigidity of said bar-like members are selected for each of said dynamic damper so that each said dynamic damper has a different natural frequency.

6. A rotary information recording and reproduction apparatus according to claim 2 wherein a plurality of dynamic dampers are provided and wherein the mass of said weight member and spring rigidity of said bar-like members are selected for each of said dynamic damper so that each said dynamic damper has a different natural frequency.

7. A rotary information recording and reproduction apparatus according to claim 1 wherein when a fixing point between said bar-like members and said housing is referred to as P and a location of a center of gravity of said rotary information recording and reproduction apparatus is referred to as G, the dynamic damper is disposed so that an axial direction of said bar-like members generally overlaps a straight line passing through said points P and G.

8. A rotary information recording and reproduction apparatus according to claim 2 wherein when a fixing point between said bar-like members and said housing is referred to as P and a location of a center of gravity of said rotary information recording and reproduction apparatus is referred to as G, the dynamic damper is disposed so that an axial direction of said bar-like members generally overlaps a straight line passing through said points P and G.

9. A rotary information recording and reproduction apparatus according to claim 1 wherein a viscoelastic material is filled in an interface between said dynamic damper and said housing.

10. A rotary information recording and reproduction apparatus according to claim 2 wherein a viscoelastic material is filled in an interface between said dynamic damper and said housing.

11. A rotary information recording and reproduction apparatus according to claim 1 wherein each of said bar-like members of said dynamic damper has a structure composed of a single material with a viscoelastic member adhering to its surface.

12. A rotary information recording and reproduction apparatus according to claim 2 wherein each of said bar-like members of said dynamic damper has a structure composed of a single material with a viscoelastic member adhering to its surface.

13. A rotary information recording and reproduction apparatus according to claim 1 wherein each of said bar-like members of said dynamic damper is formed by combining a pencil of lines together using a viscoelastic resin.

14. A rotary information recording and reproduction apparatus according to claim 2 each of said bar-like members of said dynamic damper is formed by combining a pencil of lines together using a viscoelastic resin.

15. A rotary information recording and reproduction apparatus according to claim 1 each of said bar-like members of said dynamic damper is formed by combining stranded wires together using a viscoelastic resin.

16. A rotary information recording and reproduction apparatus according to claim 2 wherein each of said bar-like members of said dynamic damper is formed by combining stranded wires together using a viscoelastic resin.

17. A rotary information recording and reproduction apparatus according to claim 1 wherein said weight member of said dynamic damper comprises two or more weight sections and a viscoelastic sheet that couples the weight sections together.

18. A rotary information recording and reproduction apparatus according to claim 2 wherein said weight member of said dynamic damper comprises two or more weight sections and a viscoelastic sheet that couples the weight sections together.

* * * * *

UNITED STATES PATENT AND TRADEMARK OFFICE
CERTIFICATE OF CORRECTION

PATENT NO. : 5,677,813
DATED : October 14, 1997
INVENTOR(S) : Takeshi YOSHIDA et al.

It is certified that error appears in the above-identified patent and that said Letters Patent is hereby corrected as shown below:

| Column | Line | |
|---|---|---|
| 1 | 67 | After "5-81842" insert --consumes heat energy, into which vibration energy has--. |
| 1 | 60 | After "operation" insert --,--. |
| 7 | 20 | Change "some-what" to --somewhat--. |
| 11 | 6 | After "claim 2" insert --wherein--. |
| 11 | 10 | After "claim 1" insert --wherein--. |

Signed and Sealed this

Fourteenth Day of April, 1998

Attest:

BRUCE LEHMAN

*Attesting Officer*   *Commissioner of Patents and Trademarks*